(12) United States Patent
Leibfried et al.

(10) Patent No.: US 8,205,334 B2
(45) Date of Patent: Jun. 26, 2012

(54) METHOD FOR REPAIRING A GAS TURBINE ENGINE COMPONENT

(75) Inventors: Peter E. Leibfried, Vernon, CT (US);
John P. Arrigoni, Wallingford, CT (US);
Dale A. Simard, Terryville, CT (US);
Philip J. Dunne, Thomaston, CT (US);
William G. Sorvillo, Sr., Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 742 days.

(21) Appl. No.: 11/273,057

(22) Filed: Nov. 14, 2005

(65) Prior Publication Data

US 2007/0011872 A1    Jan. 18, 2007

Related U.S. Application Data

(60) Provisional application No. 60/699,444, filed on Jul. 15, 2005.

(51) Int. Cl.
*B23P 6/00* (2006.01)
*B23P 19/04* (2006.01)

(52) U.S. Cl. .................. 29/889.1; 29/402.06; 29/402.11

(58) Field of Classification Search ............... 29/402.06, 29/402.11, 889.1
See application file for complete search history.

(56) References Cited

U.S. PATENT DOCUMENTS

| | | | | |
|---|---|---|---|---|
| 3,832,785 A | * | 9/1974 | Miller | 33/563 |
| 4,014,140 A | * | 3/1977 | Aoki et al. | 451/282 |
| 4,155,152 A | * | 5/1979 | Cretella et al. | 29/889.1 |
| 4,274,771 A | * | 6/1981 | Nishimura | 408/230 |
| 4,285,459 A | * | 8/1981 | Baladjanian et al. | 228/119 |
| 4,291,448 A | * | 9/1981 | Cretella et al. | 29/889.1 |
| 4,608,756 A | * | 9/1986 | Sharon | 30/287 |
| 4,639,991 A | * | 2/1987 | Sharon | 29/889.7 |
| 4,988,033 A | | 1/1991 | Hesse | |
| 5,028,179 A | * | 7/1991 | Grasset | 409/180 |
| 5,185,924 A | * | 2/1993 | Fraser | 29/889.1 |
| 5,269,057 A | | 12/1993 | Mendham | |

(Continued)

FOREIGN PATENT DOCUMENTS

CH     531 389 A     12/1972

(Continued)

OTHER PUBLICATIONS

Notice of Opposition—European Patent Application No. 06253713.9.

*Primary Examiner* — David Angwin
(74) *Attorney, Agent, or Firm* — Kinney & Lange, P.A.

(57) ABSTRACT

A method for repairing a component having first and second major surfaces, a thickness between the major surfaces, and an edge, is characterized by utilizing a template to determine if the component is suitable for repair, and forming a slot cut entirely through the thickness of the component. The slot extends inward from the edge of the component, has an open end at the edge of the component, a closed end within the component, a width, a radius at the closed end, and chamfered edges at the open end. Forming the slot includes forming an initial cut with a first cutting surface from the edge of the component at least to the defect, finishing the initial cut to the width and the radius with a second cutting surface, resulting in a finished cut, and chamfering the edge of the finished cut with a third cutting surface.

14 Claims, 12 Drawing Sheets

U.S. PATENT DOCUMENTS

| | | | |
|---|---|---|---|
| 5,697,151 A * | 12/1997 | Werner et al. | 29/889.1 |
| 5,755,030 A * | 5/1998 | Fraser | 29/889.1 |
| 6,091,996 A * | 7/2000 | Whitehead et al. | 700/57 |
| 6,172,327 B1 * | 1/2001 | Aleshin et al. | 219/121.64 |
| 6,238,187 B1 * | 5/2001 | Dulaney et al. | 416/241 R |
| 6,339,878 B1 * | 1/2002 | Owen et al. | 29/889.1 |
| 6,470,568 B2 * | 10/2002 | Fried et al. | 29/889.1 |
| 6,532,656 B1 * | 3/2003 | Wilkins et al. | 29/889.1 |
| 6,568,077 B1 * | 5/2003 | Hellemann et al. | 29/889.1 |
| 6,725,540 B2 * | 4/2004 | Bose et al. | 29/889.1 |
| 6,884,964 B2 * | 4/2005 | Murphy | 219/137 R |
| 6,991,434 B2 * | 1/2006 | Heinrich et al. | 416/241 R |
| 7,029,378 B1 * | 4/2006 | Gerding | 451/43 |
| 7,051,435 B1 * | 5/2006 | Subramanian et al. | 29/889.1 |
| 7,126,232 B2 * | 10/2006 | Imahara et al. | 257/798 |
| 7,146,725 B2 * | 12/2006 | Kottilingam et al. | 29/889.1 |
| 7,231,713 B2 * | 6/2007 | Boegli et al. | 29/889.1 |
| 7,249,412 B2 * | 7/2007 | Wayte et al. | 29/889.1 |
| 2004/0148793 A1 * | 8/2004 | Holder | 33/562 |
| 2005/0235492 A1 * | 10/2005 | Arness et al. | 29/889.1 |
| 2006/0146094 A1 * | 7/2006 | Eguchi et al. | 347/61 |

FOREIGN PATENT DOCUMENTS

| | | |
|---|---|---|
| DE | 2028544 A1 | 1/1971 |
| EP | 0 461 589 B1 | 1/1996 |
| EP | 0 722 808 A2 | 7/1996 |
| EP | 1312438 A1 | 5/2003 |
| EP | 1316389 A2 | 6/2003 |
| WO | WO 97/21516 A2 | 6/1997 |

* cited by examiner

METHOD FOR REPAIRING A GAS TURBINE ENGINE COMPONENT

CROSS-REFERENCE TO RELATED APPLICATIONS

The present application claims priority to U.S. Provisional Patent Application Ser. No. 60/669,444, entitled, "REPAIR SYSTEMS AND METHODS FOR GAS TURBINE ENGINE COMPONENTS", and filed on Jul. 15, 2005.

BACKGROUND

The present invention relates generally to a method and system for repairing a defect in a component, such as a gas turbine engine component (e.g., blades, vanes, etc.). More particularly, the present invention relates to a repair system and method that includes substantially removing a defect from a component by forming a slot in the component to remove a section that substantially encompasses the defect.

A gas turbine engine component, such as a blade tip, a blade trailing edge, a blade platform, a vane trailing edge, or a vane platform, may become damaged during use. During operation, the gas turbine engine component is typically exposed to high pressure, foreign objects, or high temperatures. Over time, these operating conditions may cause small cracks or other defects to develop in the gas turbine engine component. Although such defects may be small, they often have a significant impact, and the gas turbine engine component may be rendered unacceptable for use. As such, many repair processes have been developed to salvage these gas turbine engine components. It is important that the repair process or system generally preserve the integrity of the gas turbine engine component, and does not adversely affect functionality of the gas turbine engine component.

Defects in gas turbine engine components have typically been repaired by hand. In one approach, an operator holds the defective gas turbine engine component in his hand while using a grinding wheel, a carbide cutter, or other tool or cutting surface to route out (i.e., remove) at least a substantial amount of the defect in the part. The operator generally determines a geometry of the section to be removed based upon the type and location of the defect. Thereafter, the gas turbine engine component is built back up, such as by welding a replacement piece to the gas turbine engine component, in order to place the gas turbine engine component in a condition that allows it to be returned to service in an engine. This approach is less than ideal because various operators may utilize different cutting surfaces (e.g., grinding wheels), which may remove different amounts of material from a gas turbine engine component, possibly creating different edge geometries. A diversity in edge geometries may cause the welding process to be more difficult and variable from one operator to another. Further, the inability to reproduce repair procedures may be a drawback in some manufacturing and servicing environments.

BRIEF SUMMARY

The present invention is a method of repairing a defect in a component. The method includes forming a slot in the component to remove at least a substantial part of the defect, where the slot includes a predetermined geometry. The present invention is also a system for repairing a defect in a component, where the system includes a fixture configured to receive the component and secure the component in a position and at least one removal device capable of forming a slot of a predetermined geometry in the component.

DETAILED DESCRIPTION

Figure 1:
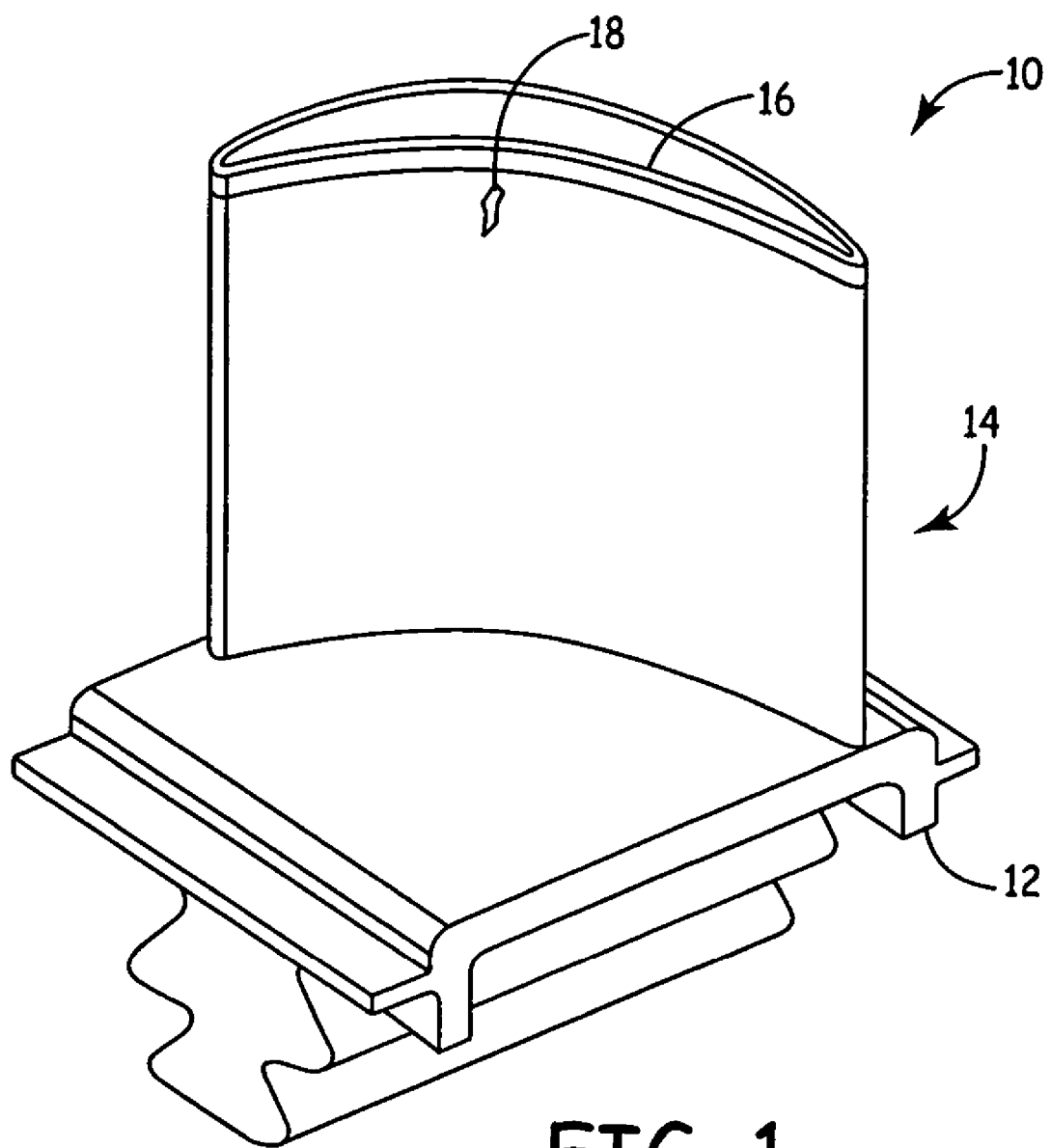
FIG. 1 is a perspective view of a gas turbine engine blade, which includes a platform and a main body (including a tip).

The present invention is both a method and system for repairing a defect in a component, such as a gas turbine engine component (e.g., a turbine blade tip, turbine blade trailing edge, turbine blade platform, vane trailing edge, vane platform, etc.), where the method and system may each be used to prepare a component for a weld repair process. As stated in the Background section, a defect in a component may be in the form of a crack in a body of the component. As used herein, the term "defect" includes any internal or external feature, characteristic, attribute, aspect, or other such quality that is present or existing within a component, and for which removal or repair thereof is desirable. This damage may take the form of physical or structural deformations, malformations, imperfections, anomalies or irregularities including, but not limited to, cracks, dents, fissures, fractures, pits, depressions, voids, cavities, and substandard surfaces or edges. Additionally, the damage may take the form of material-based flaws, weaknesses, or non-uniformities.

In accordance with the general principles of the invention, at least a substantial amount of a defect is removed from a component by removing a section of the component that substantially encompasses the defect. In the present invention, the defect is removed by forming (or "creating") a "slot" in the component to remove a section of the component that substantially encompasses the defect. A "slot" is used as a general term describing a void left in a component after a portion thereof is removed, and the use of the term "slot" is not intended to limit the scope of the present invention to specific shapes or geometries disclosed in the embodiments. The slot formed in the component has a predetermined geometry (i.e., a predetermined shape), which is selected based upon various factors that will be discussed below. As the slot is formed, at least a substantial part of the defect is removed, leaving a void in the component. The slot may also encompass regions adjacent the visible defect in order to remove any latent or unexposed damage. The void in the component created by the slot may then be repaired according to methods known in the art, such as by welding (or otherwise integrally joining) a replacement piece to the component in order to fill the void. In this way, a component may be prepared for repair by removing at least a substantial part of the defect in the component. Hereinafter, referring to removal of the "defect" should be understood as meaning "at least a substantial part of the defect".

The predetermined slot geometry is selected based upon various factors. One consideration is whether the geometry will aid a subsequent repair process (e.g., a weld repair process). In the embodiments described below, the slot has a radial end portion that provides an area for a weld pool to gather, while a welding may use the chamfered edges as a visual reference point for where a sidewall weld build-up should stop.

The slot geometry is also selected based upon a study of a structure of the component being repaired, such as a stress analysis of the component in its particular application. When a portion of a component is removed in order to remove a defect, the structural integrity of the component may be adversely affected. For example, if a part of a hollow turbine blade wall is removed to remove a defect, leaving a void, and a replacement piece is welded in the void, the turbine blade wall may not be as structurally sound because the seams from the weld repair may weaken the turbine blade wall. Furthermore, the shape of the void may also affect the stress distribution properties of the turbine blade. The inventors of the present invention believe that the particular slot geometry disclosed in the embodiments helps to minimize adverse affects on the structural integrity of a turbine blade. This is, in part, due to the sound weld resulting from how the geometry of the slot aids the welding process. The slot geometry should be selected with these considerations in mind, in order to prevent failure of the component after repair.

The inventive repair system and method may be used to remove a defect in a component more consistently than with many existing methods because of the predetermined geometry of at least a part of the slot. Rather than an operator determining what the slot geometry will be during the repair process, the geometry is predetermined and is consistent for each repair process using the particular repair process or system, regardless of the operator or irrespective of the extent of the damage. The consistency is attributable to the fixtures and devices of the inventive method and system. The resulting consistency allows for a generally reproducible method and system of repair, which may be advantageous in many manufacturing and servicing environments. Furthermore, the inventive system and method of the present invention are more ergonomic than many current systems and methods because of the use of fixtures to hold the component in a predetermined position.

In a first embodiment of the present invention, a single device is used to form a slot in a component. In a second embodiment of the present invention, multiple devices are used to form a slot in a component. Each of the multiple devices includes a different cutting surface, which each serve a different function. A first device forms an initial cut in the component. A second device finishes the initial cut to a predetermined width and radius, which results in a finished cut. Finally, a third device chamfers the edges of the finished cut.

FIG. 1 is a perspective view of blade 10, for use in a gas turbine engine. Blade 10 is shown as an example of a "component" that may be used in conjunction with the present invention. Blade 10 includes platform 12 and main body 14, which includes tip 16. Main body 14 of blade 10 typically includes complicated passages (not shown) for cooling air. These passages aid the cooling of blade 10 during operation of the gas turbine engine, and without such cooling, blade 10 may overheat and main body 14 may warp. While the present invention is described in reference to blade 10, it should be understood by those skilled in the art that the present invention is applicable to any suitable damaged component that requires repair.

Once a damaged component is discovered, it is preferable that an operator determines whether the damage is suitable for repair before delving into the repair process. Various factors influence whether a component may be repaired. In the case of blade 10, a defect within main body 14 may not be suitable for repair if the removal of the defect would damage the internal cooling passages. A template that identifies a repairable area on the component may be used to determine whether a defect is suitable for repair.

Figure 2:
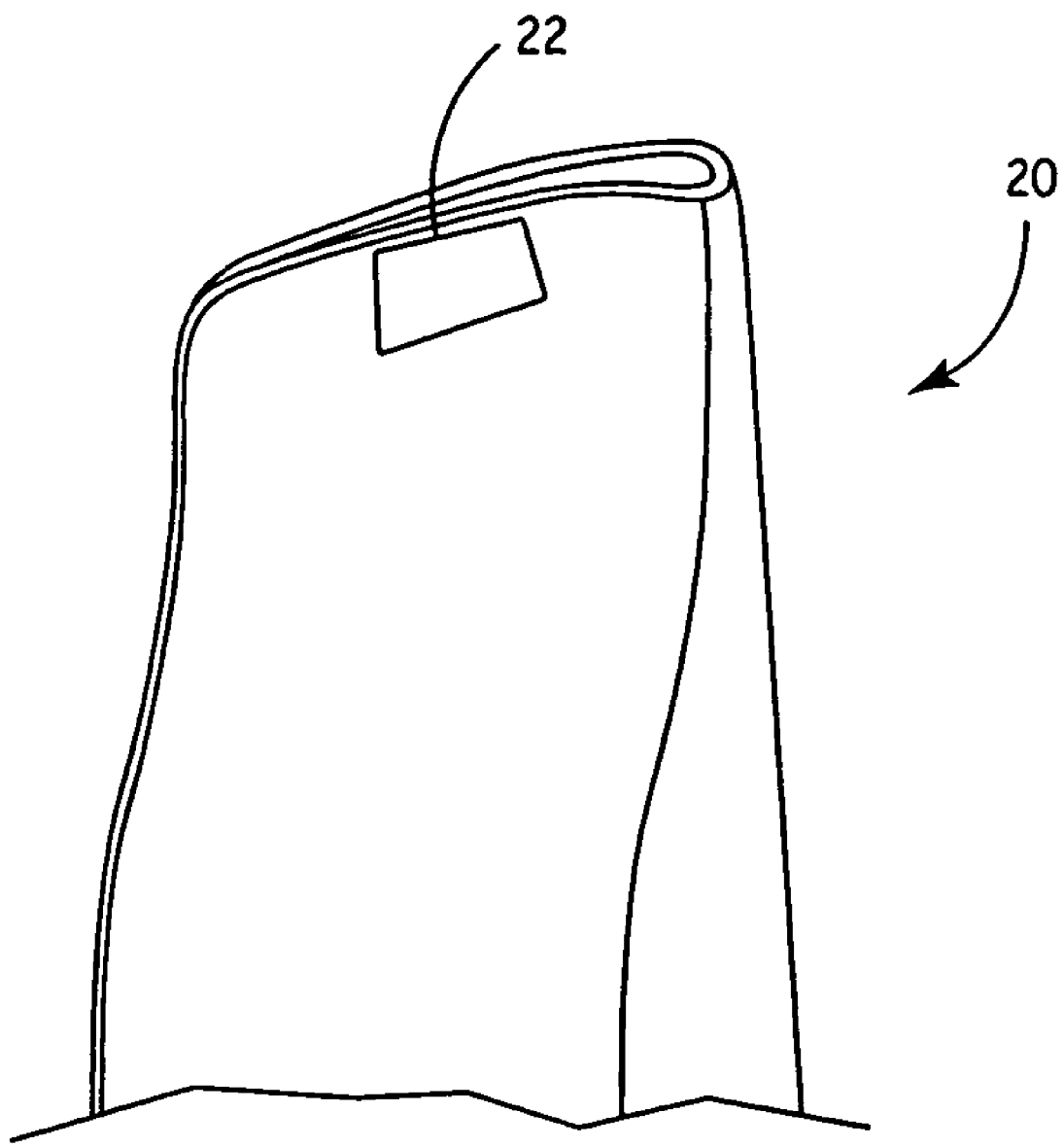
FIG. 2 is a perspective view of a template that may be used to determine whether a component is repairable.

FIG. 2 is a perspective view of template 20, which may be used to determine whether a component may be repaired. Template 20 is designed to fit over blade 10 (shown in FIG. 1). Repairable area 22 (which is shown to be a trapezoidal shape) has been identified as the area that may be repaired. Repairable area 22 of template 20 was selected after an internal geometry of blade 10 was analyzed to ensure that repairs would only be made in areas that would not adversely affect the internal structure (e.g., cooling passageways) or integrity of blade 10. For example, it may be preferred to leave a minimum gap (e.g., 0.035 inches) between any slot and internal structure in order to allow for a sound weld between a replacement piece and blade 10. In alternate embodiments, repairable area 22 may be also encompass areas of blade 10 (or other component) that are not subject to maximum stress, in order to minimize the possibility of failure of blade 10 after repair.

The boundaries of repairable area 22 may be formed using any suitable method, such as by scribing lines directly on template 22, or otherwise marking template 22. If a defect falls within the area bounded by repairable area 22, then the defect can be repaired using the present invention. However, if a defect falls outside repairable area 22, the defect cannot be repaired using this invention without adversely affecting the internal cooling passages of main body 14 of blade 10. In this way, template 20 provides a visual indicium of whether a defect is suitable for repair.

Template 20 may be formed of a transparent material, such as Plexiglas. It is preferred that at least a part of template 20 is formed of a transparent material because after template 20 is positioned over blade 10, it is necessary to compare a location of the defect with the location of repairable area 22. In alternate embodiments, repairable area 22 is identified using other suitable means. For example, template 20 may be opaque with a transparent window only allowing the repairable area 22 to be viewed by an operator. Template 20 (and repairable area 22) may be modified so that it can be used with a component other than blade 10.

Once it has been determined that blade 10 can be repaired, a slot is formed in blade in order to remove at least a substantial amount of crack 16 therefrom. Forming the slot in blade 10 prepares blade 10 for weld repair (using processes known in the art), so that blade 10 may be repaired and returned to service. For example, in a subsequent weld repair step, a replacement piece shaped similarly to the slot may be welded into the slot. Thereafter, the replacement piece may be machined down to the desired geometry.

Figure 3:
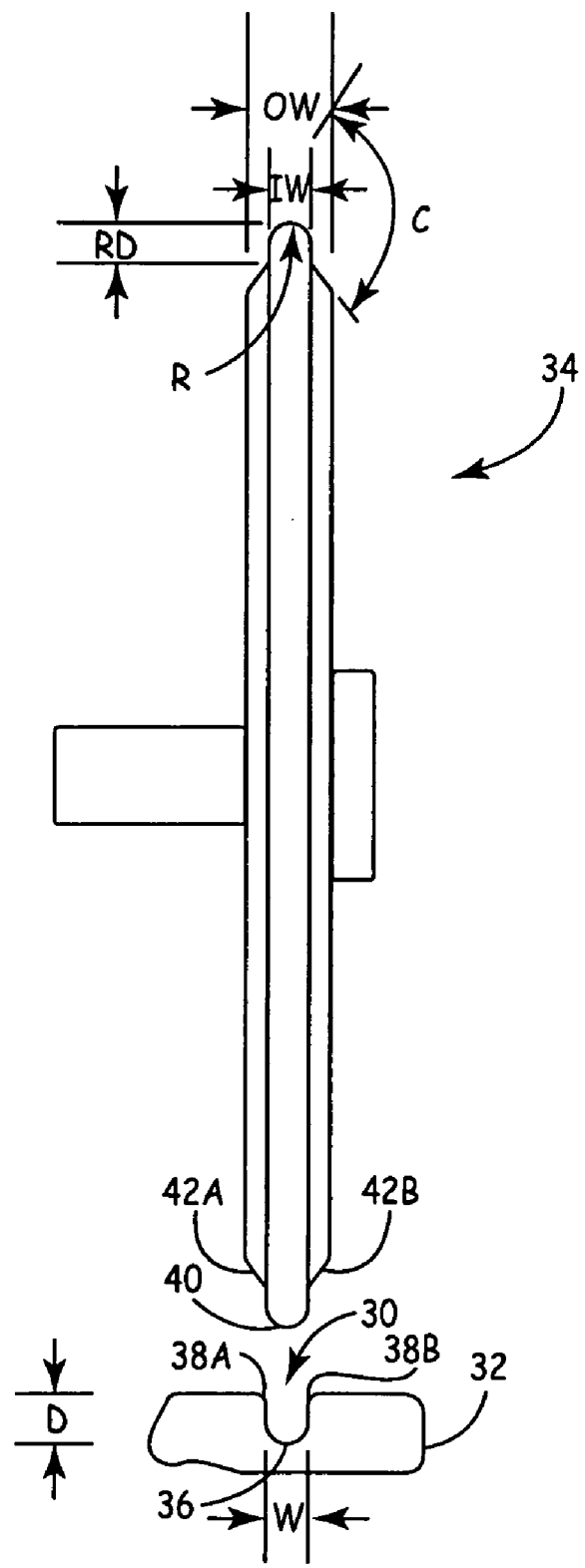
FIG. 3 is a schematic sectional view of an example of a slot in a component (shown as a partial section), where the slot has a geometry that facilitates the weld repair process.

FIG. 3 is a schematic side view of an embodiment of slot 30 in component 32 (shown as a partial section). Component 32 is shown as any generic component that includes a defect that requires repair, such as blade 10. Also shown in FIG. 3 is a side view of an example of a suitable grinding wheel 34 that may be used to form slot 30 in accordance with the first embodiment of the present invention. Slot 30 has a geometry that facilitates a weld repair process after at least a substantial part of the defect is removed from component 32. Specifically, end portion 36 of slot 30 provides an area for a weld pool to gather, while chamfered edges 38A and 38B of slot 30 provide a visual reference point for determining a stopping point for sidewall weld build-up.

If component 32 is a gas turbine engine blade including internal cooling passages, such as blade 10, a depth of chamfered edges 38A and 38B depend upon a thickness of a wall (i.e., a dimension between the exterior surface of component 32 and the interior cooling passages) generally at the location of defect in component 32. By using a chamfer depth generally equal to a thickness of a wall of component 32 generally at the location of the defect in component 32, a welder is given a visual indicium of a thickness of the wall, which aids the welder in weld-repairing blade 10.

Determining a desired depth D of slot 30 is based on various factors, including the internal geometry of component 32 and the geometry of the defect in component 32. For example, if component 32 is blade 10 of FIG. 1, a consideration for determining depth D includes the location of the internal cooling passages in main body 14 of blade 10. The internal cooling passages typically need to be of a certain minimum size in order to facilitate proper air circulation and cooling of blade 10. As a result, depth D will depend on the desired size of the cooling air passages. Furthermore, depth D must be large enough to substantially remove the defect from blade 10.

Grinding wheel 34 may be any suitable grinding wheel, such as, but not limited to, a cubic boron nitride (CBN) wheel or a diamond plated steel wheel. In the first embodiment of the present invention, grinding wheel 34 is designed to have a geometry that allows slot 30 to be cut, radius 36 of slot 30 to be rounded, and edges 38A and 38B slot 30 to be chamfered, with a single device with a single cutting tool, rather than multiple devices each having a separate cutting tool (e.g., the second embodiment described in reference to FIGS. 8A-11B). The use of a single device provides the advantage of time efficiency over the second embodiment, which includes the use of multiple devices to form slot 30.

Section 40 of grinding wheel 34 forms radius 36, while sections 42A and 42B form chamfers 38A and 38B, respectively. A geometry of grinding wheel 34 is complimentary to slot 30. That is, the dimensions of grinding wheel 34 determine the depth D and width W of slot 30, and the depth of chamfered edges 38A and 38B. In the first embodiment of the present invention, grinding wheel 34 has route depth RD of about 0.060 inches, radius R of about 0.625 inches, inner width IW of about 0.125 inches, and an outer width OW of about 0.25 inches, and a chamfer angle C of about 135 degrees (°). Depth D of slot 30 is generally equal to route depth RD of grinding wheel 34, while width W of slot 30 is generally equal to inner width IW of grinding wheel 34, and so forth. In alternate embodiments, grinding wheel 34 may have a route depth RD of about 0.100 inches, about 0.140 inches, or about 0.150 inches. In order to achieve slots of different depths, widths, and/or chamfer depths, grinding wheels having different dimensions are used.

Figure 4:
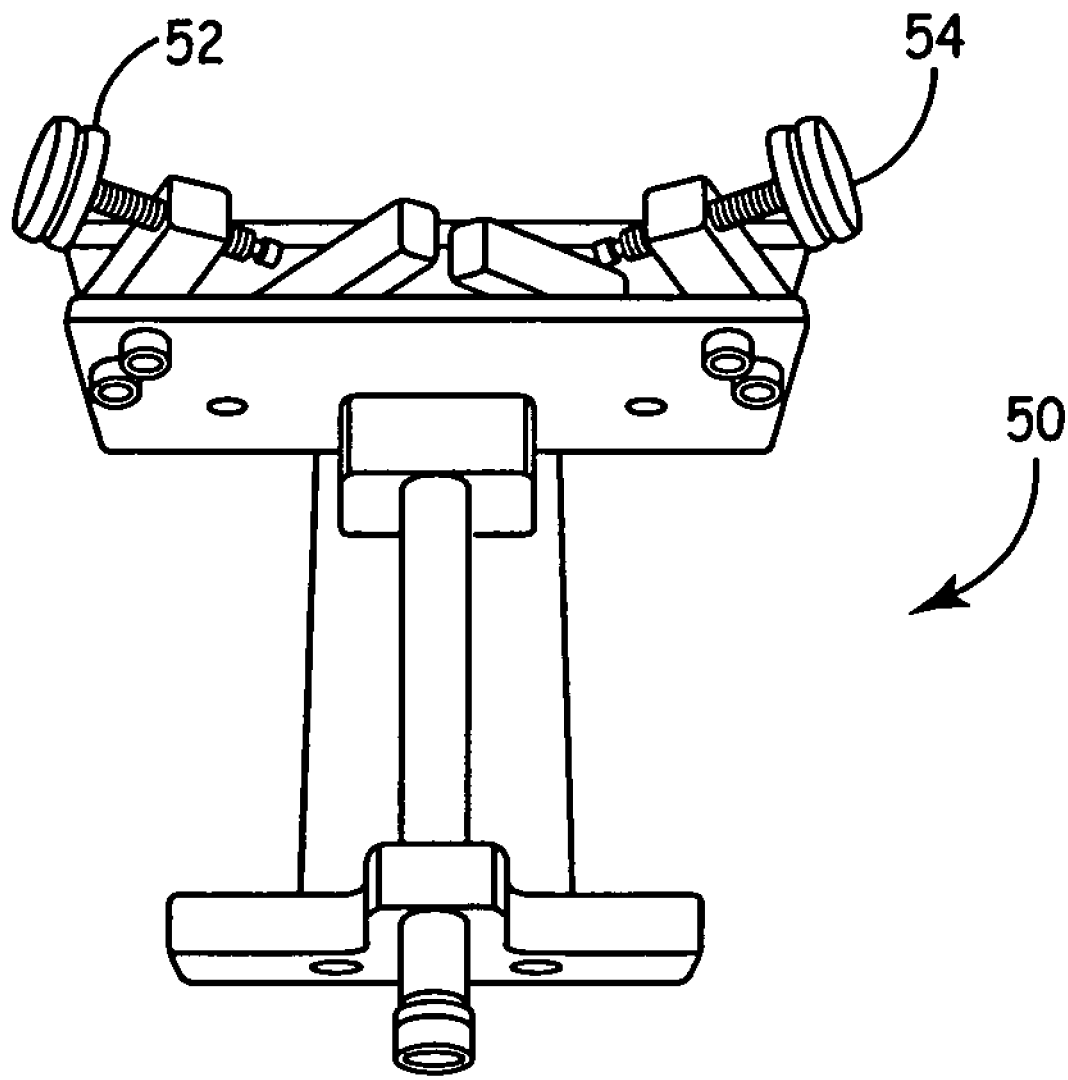
FIG. 4 is a perspective view of a universal holding fixture, which may be used to hold a component in a predetermined position while a slot is formed in the component.

FIG. 4 is a perspective view of holding fixture 50, which may be used to hold blade 10 (or other component) in a predetermined position while a slot is formed in blade 10. Specifically, holding fixture 50 is configured to attach to a device (e.g., device 65 of FIG. 7 or rough-cut fixture 90 of FIG. 9A), and functions to hold blade 10 in a fixed, predetermined position while the device forms a cut in blade 10. Once it has been determined that blade 10 can be repaired (e.g., by using template 20 shown in FIG. 2), an operator may position blade 10 in holding fixture 50, or any suitable holding fixture. Holding fixture 50 is designed to hold blade 10 in a predetermined position so that defects therein can be easily and consistently removed by various operators. Holding fixture 50 includes clamps 52 and 54, which are configured to hold blade 10 in a substantially fixed position. As it will be shown in FIG. 6, clamps 52 and 54 each grasp main body 14 of blade 10.

Figure 5:
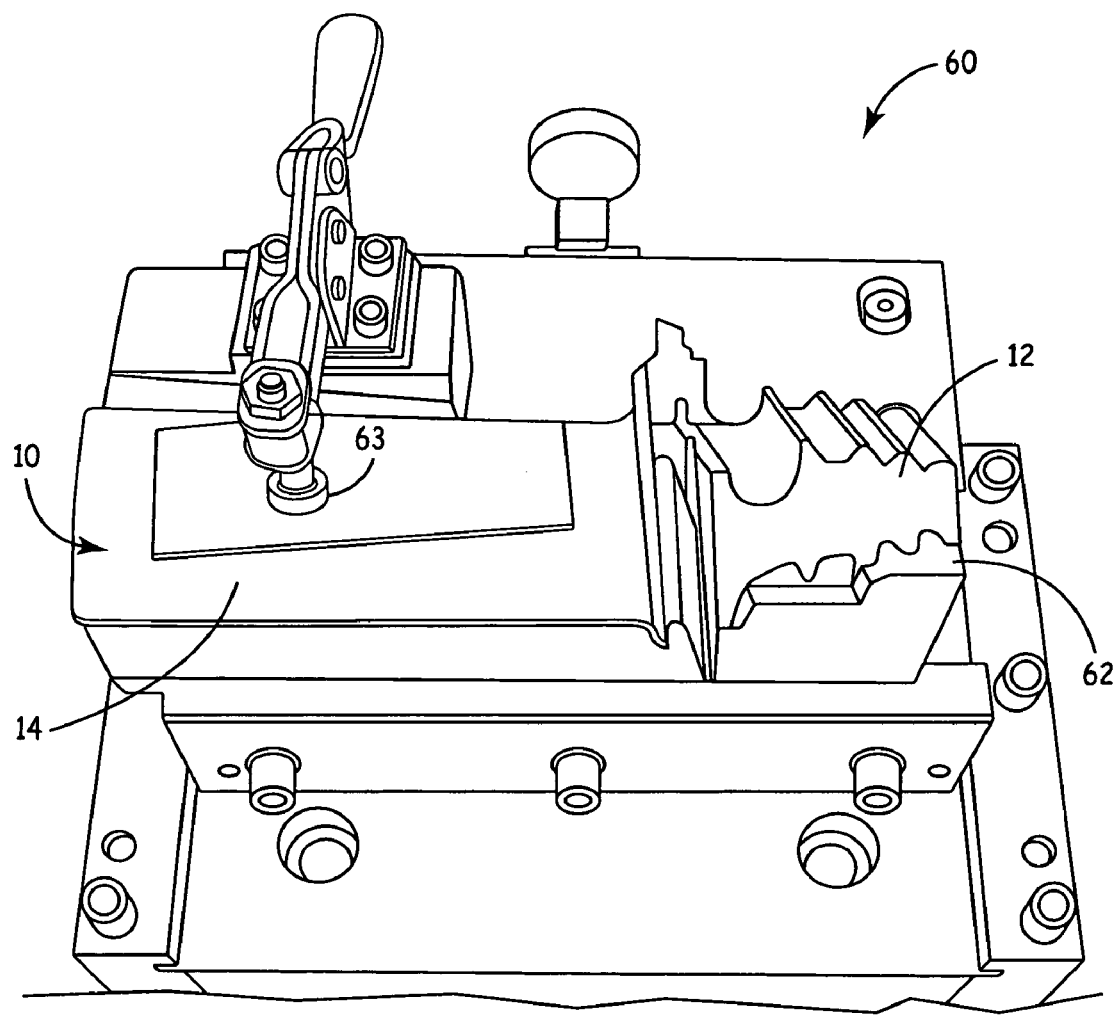
FIG. 5 is a perspective view of a holding fixture that is configured to receive one specific component.

Holding fixture 50 is designed as a universal fixture that is capable of receiving and holding various components in various positions. In an alternate embodiment, a holding fixture is configured to receive one specific component. An example of such a fixture is shown in FIG. 5, which shows a perspective view of fixture 60. Fixture 60 is designed to hold blade 10 in a specific position to ensure all operators orient blade 10 the same when removing a defect from blade 10. Unlike fixture 50 of FIG. 4, fixture 60 is not designed to hold to various components. Rather, fixture 60 is designed to hold only blade 10. Fixture 60 includes ridges 62, clamp 63, and shoulder 64. Main body 14 of blade 10 rests on shoulder 64, while platform 12 of blade 10 rests on ridges 62. Ridges 62 are configured to mate with ridges in platform 12 of blade 10. Clamp 63 secures blade 10 in place. While the rest of the detailed description discusses the use of fixture 50 of FIG. 4, it should be kept in mind that fixture 60 may be a suitable substitution for fixture 50.

Figure 6:
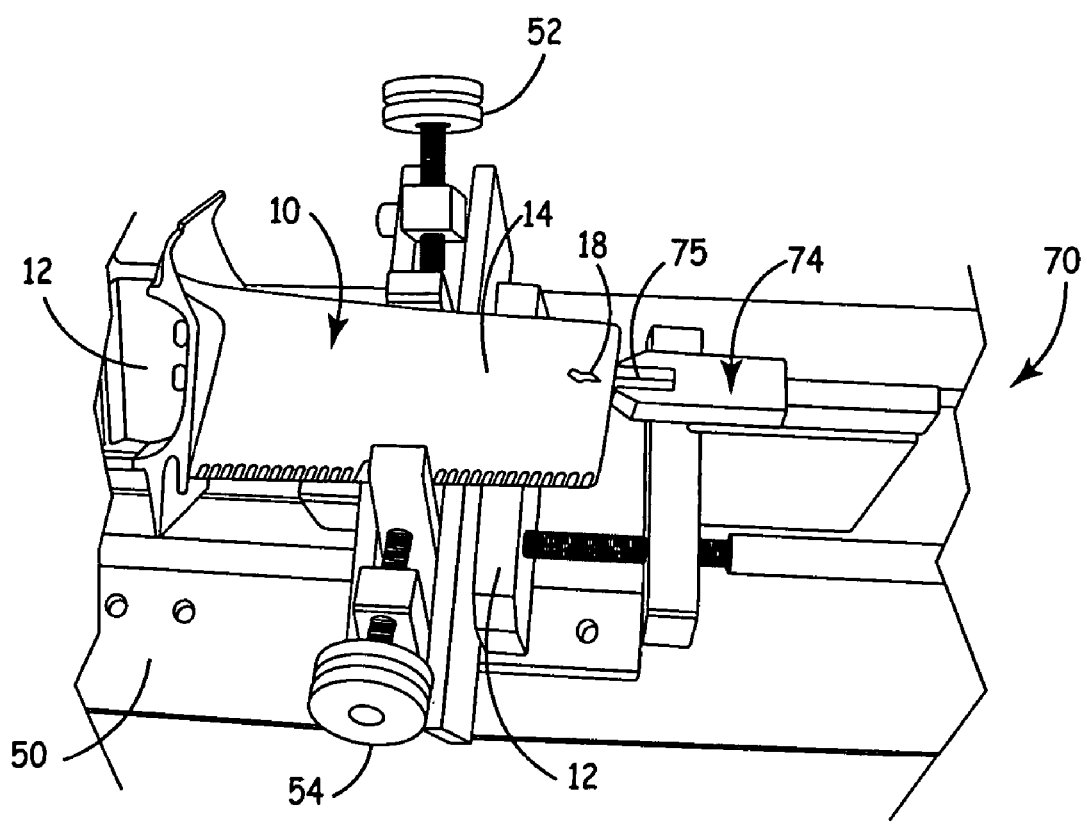
FIG. 6 is a perspective view of a set-up fixture that may be used to align a blade within a holding fixture.

FIG. 6 is a perspective view of set-up fixture 70, where holding fixture 50 is attached to set-up fixture 70, and blade 10 is positioned in holding fixture 50 and secured by clamps 52 and 54. An operator may utilize set-up fixture 70 to properly position blade 10 within holding fixture 50 so that blade 10 aligns properly with the cutting device.

Blade 10 is first positioned in holding fixture 50, and then holding fixture 50 is positioned in set-up fixture 70. In order to position blade 10 in holding fixture 50, blade 10 is brought parallel to holding fixture 50 and positioned against indicator stop 72. Blade tip 16 is aligned with mark 75 on indicator 74. Once crack 18 on blade tip 16 is aligned with mark 75, and blade 10 is otherwise aligned with set-up fixture 70, clamps 52 and 54 are tightened down so blade 10 is held securely in holding fixture 50. In an alternate embodiment, holding fixture 50 is positioned in set-up fixture 70, and then blade 10 is positioned in holding fixture 50. After blade 10 is properly positioned within holding fixture 50, blade 10 and holding fixture 50 may be removed from set-up fixture 70.

Figure 7:
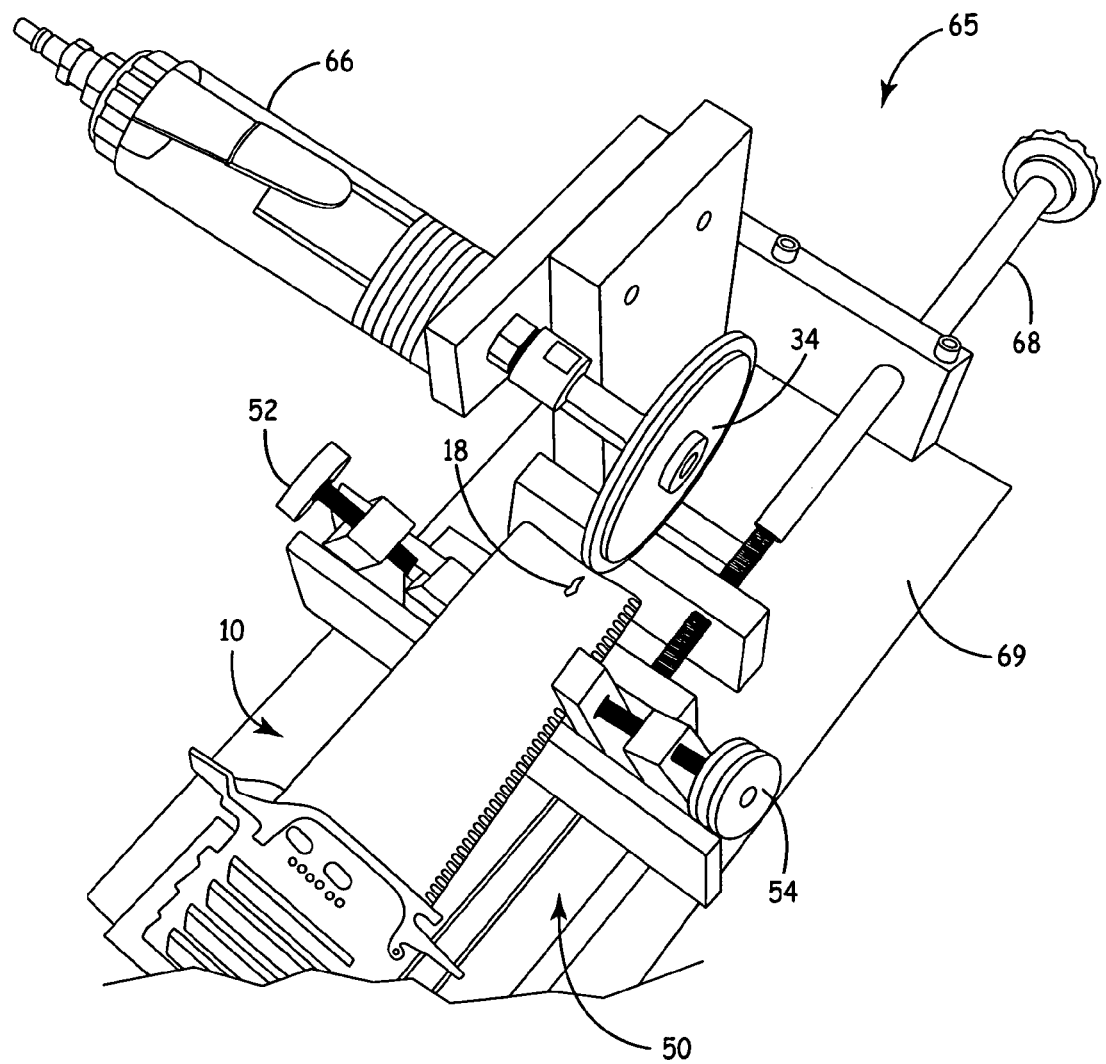
FIG. 7 is a perspective view of a device that may be used in accordance with a first embodiment of the present invention, where the device includes a grinding wheel that is capable of forming a slot in a component.
Figure 9A:
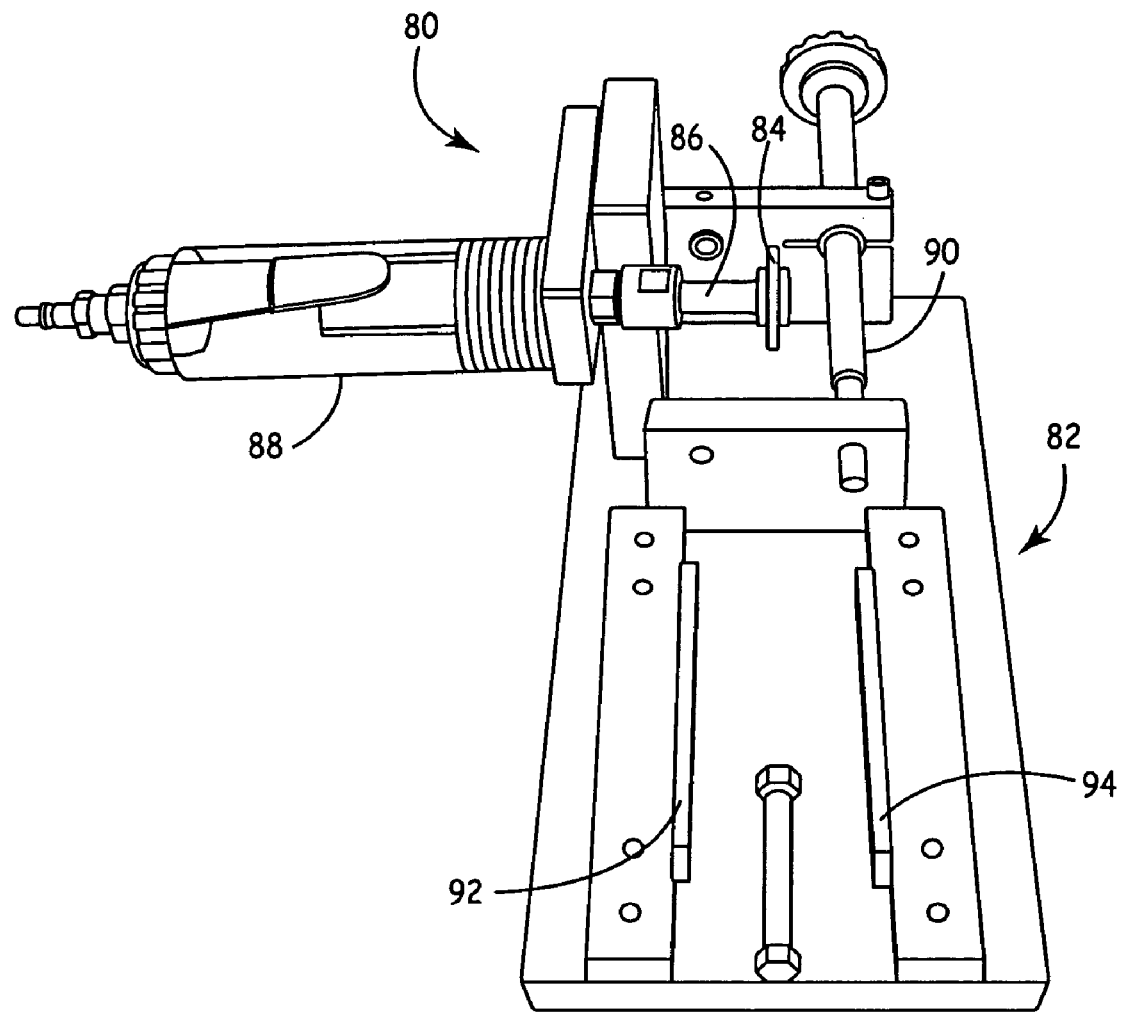
FIG. 9A is a perspective view of a rough-cut fixture, which may be used to form an initial cut in a component.

FIG. 7 is a perspective view of device 65, which may be used to form a slot in blade 10, in accordance with a first embodiment of the present invention. Holding fixture 50 is attached to device 65. Device 65 includes grinding wheel 34 (also described in reference to FIG. 3), air gun 66, which drives grinding wheel 34, screw 68, and frame 69. Air gun 66 is mounted to frame 69, while grinding wheel 34 is coupled to air gun 66. Frame 69 of device 65 is configured to receive holding fixture 50. For example, frame 69 may include rails that mate with corresponding grooves in holding fixture 50. Examples of suitable rails that may be incorporated into frame 69 are shown in FIG. 9A with respect to rough-cut fixture 80. After holding fixture 50 and frame 69 are secured together, screw 68 is aligned with a corresponding threaded hole 96 (shown in FIG. 9B) in holding fixture 50 to secure holding fixture 50 to frame 69. In alternate embodiments, holding fixture 50 and frame 69 may be secured together using any suitable means, such as, but not limited to, a clamping mechanism.

Once it has been determined that crack 18 in tip 16 of blade 10 is suitable for repair, an operator may position blade 10 in holding fixture 50 in a predetermined position, as described in reference to FIGS. 5 and 6. Holding fixture 50 is then attached to device 65, and because blade 10 was aligned on holding fixture 50 using set-up fixture 70 (shown in FIG. 5), crack 18 has been "pre-aligned" with grinding wheel 34. Grinding wheel 34 is then rotated with air gun 66 as it is placed in contact with crack 18, thereby removing material and forming a slot (e.g., slot 30 shown in FIG. 3). Once the slot is formed in tip 16 of blade 10, blade 10 is ready to be weld repaired (by processes known in the art) and returned to service in a gas turbine engine. In alternate embodiments, holding fixture 60 may be substituted for holding fixture 50.

In a second embodiment of the present invention, a slot is formed in a component using multiple devices, where the final slot is formed in three steps: 1) an initial cut is formed in the component, 2) the initial cut is finished to a predetermined width, while a end portion of the initial cut is formed to a predetermined radius, resulting in a finished cut, and 3) edges of the finished cut are chamfered. This embodiment is discussed in reference to FIGS. 8A-11B. FIGS. 8A-8D illustrate each step in forming a slot in a component. Specifically, FIGS. 8A-8D are a schematic side views of crack 18 in blade 10 (also shown in FIG. 1), initial cut 76 in blade 10, finished cut 77 in blade 10, and slot 78 in blade 10, respectively, in accordance with the second embodiment of the present invention.

Figure 8A:
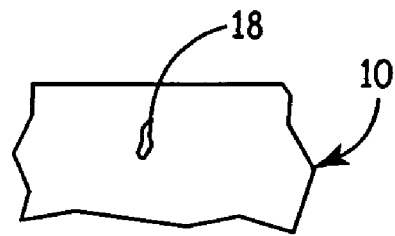
FIGS. 8A-8D are schematic side views of the different steps in forming a slot in accordance with a second embodiment of the present invention, which includes forming an initial cut (FIG. 8B), finished cut (FIG. 8C), and final slot in the blade (FIG. 8D).
Figure 8B:
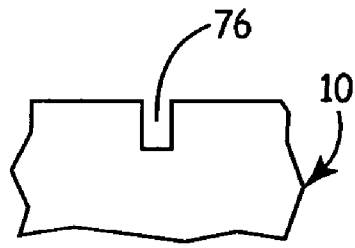

FIG. 8A is a schematic side view of blade 10, in which crack 18 has formed. It is assumed for purposes of description that crack 18 is suitable for repair. FIG. 8B is a schematic side view of blade 10, where initial cut 76 has been formed therein with a first cutting device (e.g., rough-cut fixture 80 shown in FIG. 9A). Initial cut 76 in blade 10 substantially removes crack 18 (and possibly some material surrounding crack 18 in order to remove latent defects) from blade 10, and produces a rough-cut rout in blade 10. Initial cut 76 does not have the desired geometry of the slot. Rather, this desired geometry is achieved with a second and a third devices, which form the finished cut 77 (FIG. 8C) and the finished slot 78 (FIG. 8D). Precutting blade 10 by forming initial cut 76 limits the amount of cutting that will be need to be done afterwards with a carbide cutter.

Figure 8C:
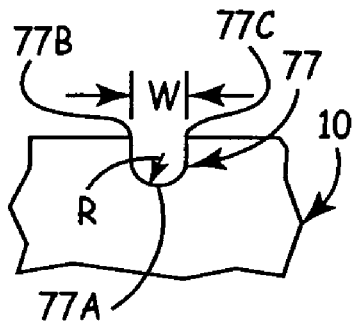
Figure 8D:
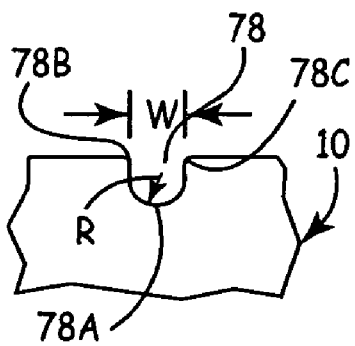

FIG. 8C is a schematic side view of blade 10, where finished cut 77 has been formed therein. Finished cut 77 is formed by finishing initial cut 76 (shown in FIG. 8B) to a predetermined width W and finishing end portion 77A to radius R with a second device (e.g., finish router 100 shown in FIG. 10A). While finished cut 77 has a geometry that is close to the desired geometry of final slot 78 (shown in FIG. 8D), edges 77B and 77C of finished cut 77 are still unfinished (i.e., unchamfered).

FIG. 8D is a schematic side view of blade 10, where slot 78 is formed therein. Width W and radius R of end portion 78A of slot 78 have the same dimensions has width W and radius R of end portion 77A of finished cut 77. In order to form slot 78 having the desired geometry, edges of finished cut 77B and 77C are chamfered to form edges 78B and 78C. Resulting slot 78 has a geometry that facilitates the weld-repair process, as previously discussed.

FIG. 9A is a perspective view of rough-cut fixture 80, which includes frame 82, grinding wheel 84, spindle 86, air gun 88, which is mounted to frame 82, and screw 90. Grinding wheel 84 is mounted on spindle 86, which is coupled to and driven by air gun 88. Rough-cut fixture is an embodiment of a device that may be used to form initial cut 76 (shown in FIG. 8B) in tip 16 of blade 10 to remove at least a substantial portion of crack 18. Frame 82 of rough-cut fixture 80 is configured to receive holding fixture 50 (shown in FIG. 4). Frame 82 includes rails 92 and 94, which mate with corresponding grooves in holding fixture 50. By aligning holding fixture 50 grooves with rails 92 and 94 and "sliding" holding fixture 50 onto frame, holding fixture 50 is attached to rough-cut fixture 80. After holding fixture 50 and rough-cut fixture 80 are attached together, screw 90 is aligned with a corresponding threaded hole 96 (shown in FIG. 9B) in holding fixture 50 to secure holding fixture 50 to rough-cut fixture 80. In alternate embodiments, holding fixture 50 and rough-cut fixture 80 may be secured together using any suitable means.

Grinding wheel 84 may be carbide cutter or an impregnated fiber cutoff wheel. A 0.065" or 0.125" wide grinding wheel 84 may be used. Grinding wheel 84 has a different geometry than grinding wheel 34 from the first embodiment. Grinding wheel 84 is shaped to form initial cut 76 in blade 10, rather than a slot having the final geometry. Air gun 88 drives shaft 86, and thereby drives grinding wheel 84, which is attached to shaft 86. Air gun 88 may be any suitable high power air gun, such as, but not limited to, a Dotco, model 1212500-01rt, 23000 rpm, 90 psi/6.1 Bar, which is made commercially available by CooperTools, Houston, Tex. In alternate embodiments, any suitable mechanical motor or other driving device may be substituted for air gun 88.

Figure 9B:
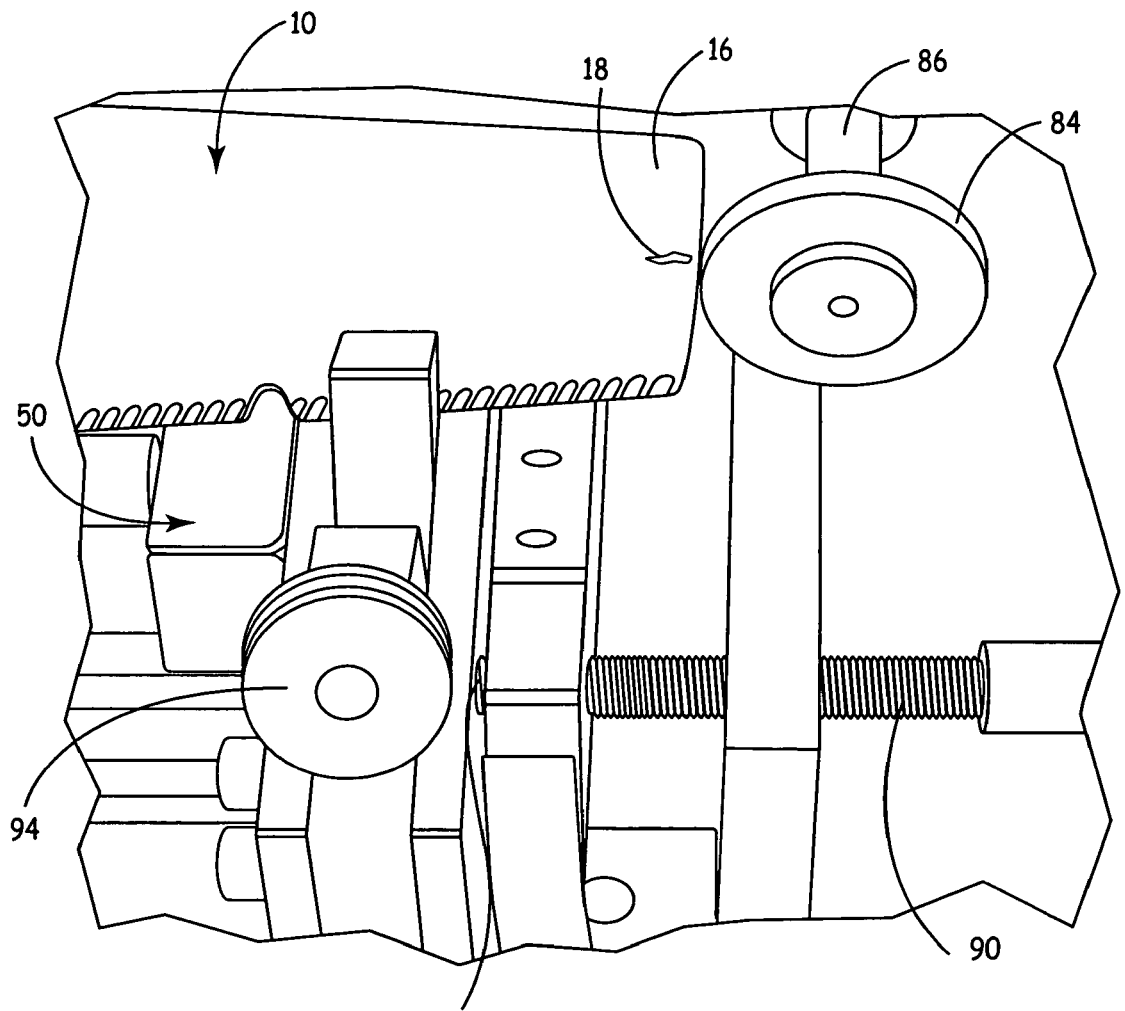
FIG. 9B is a partial perspective view of the rough-cut fixture shown in FIG. 9A, where a holding fixture has been attached to the rough-cut fixture by mating ridges in the rough-cut fixture with grooves in the holding fixture.

FIG. 9B is a partial perspective view of rough-cut fixture 80, where holding fixture 50 has been attached to rough-cut fixture 80 by mating ridges 92 and 94 (shown in FIG. 9A) with corresponding grooves in holding fixture 50. As FIG. 9B shows, screw 90 is aligned to fit within a corresponding threaded hole 96 in holding fixture 50. Blade 10 is securely clamped to holding fixture 50, and grinding wheel 84 is positioned to form an initial cut in blade 10. Specifically, crack 18 in tip 16 of blade 10 is aligned with grinding wheel 84 so that initial cut 76 is substantially superimposed over crack 18, thereby removing at least a substantial section of crack 18 from tip 16 of blade 10.

Figure 10A:
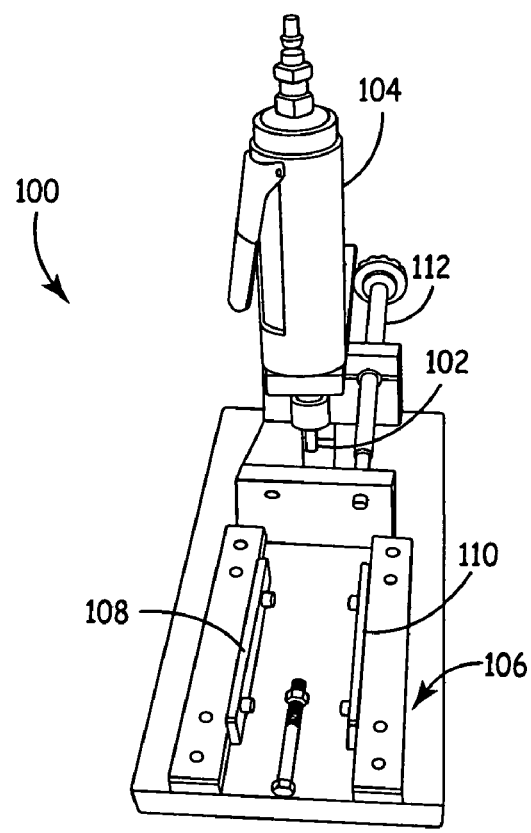
FIG. 10A is a perspective view of a finish router, which may be used to finish the initial cut in a component to a predetermined width and radius, thereby forming a finished cut.
Figure 10B:
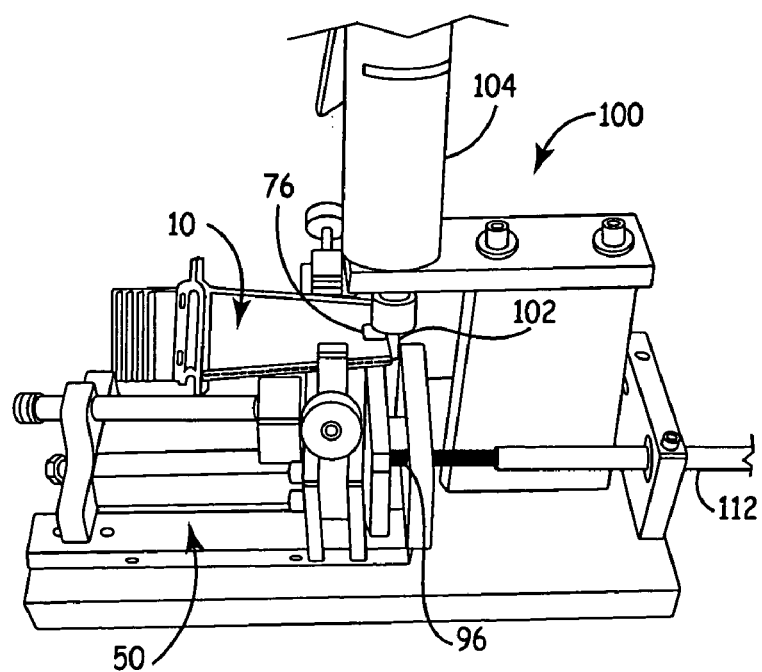
FIG. 10B is a perspective view of the finish router of FIG. 10A, where a router is positioned in contact with an initial cut in a blade.

Once initial cut 76 is formed, holding fixture 50 (with blade 10 securely fastened therein) is removed from rough-cut fixture 80. Initial cut 76 is then finished to a predetermined width and radius with a second cutting device, resulting in finished cut 77 (shown in FIG. 8C). In the second embodiment, the second cutting device is finish router 100, which is shown in FIGS. 10A and 10B. In alternate embodiments, any suitable cutting device with a cutting surface configured to finish the initial cut to a predetermined width and radius may be used.

FIG. 10A is a perspective view of finish router 100, which includes router 102, air gun 104, and frame 106. Air gun 104 is mounted to frame 106, while router 102 is coupled to and driven by air gun 104. As with frame 82 of rough-cut fixture 80, frame 106 includes rails 108 and 110, which mate with corresponding grooves in holding fixture 50. Holding fixture 50 and finish router 100 are further secured together using screw 112, which is configured to fit within a corresponding threaded hole 96 (shown in FIG. 10B) in holding fixture 50. In alternate embodiments, holding fixture 50 and finish router 100 maybe secured together using any suitable means.

Router 102 may be a 0.125 inch carbide cutter. In alternate embodiments, carbide cutters of any suitable size, or any suitable cutting surface may be used to finish initial cut 76 (shown in FIG. 8B). Router 102 establishes a consistent routing width and radius at the end of initial cut 76. As with air gun 88 of rough-cut fixture 80, air gun 104 may be any suitable high power air gun, such as, but not limited to, a Dotco, model 1212500-01rt, 23000 rpm, 90 psi/6.1 Bar, which is made commercially available by CooperTools, Houston, Tex. In alternate embodiments, any suitable mechanical motor or other driving device may be substituted for air gun 104.

FIG. 10B is a partial perspective side view of finish router 100, where holding fixture 50 has been attached to finish router 100 by mating ridges 108 and 110 (shown in FIG. 10A) with corresponding grooves in holding fixture 50. Screw 112 is threaded through threaded hole 96 in holding fixture 50, thereby further securing holding fixture 50 to finish router 100. Blade 10 is securely clamped to holding fixture 50.

FIG. 10B illustrates how router 84 aligns with initial cut 76 to finish initial cut 76 to a predetermined width and radius to form finished cut 77. Because blade 10 was aligned on holding fixture 50 with set-up fixture 70, positioning holding fixture 50 on finish router 100 aligns initial cut 76 with router 102, such that router 102 is centered with initial cut 76. Router 102 is then rotated with air gun 104 as it is placed in contact with initial cut 76, thereby removing material and finishing a width and radius of initial cut 76 to the predetermined dimensions. As those skilled in the art recognize, the width and radius of initial cut 76 are determined by the size of router 102.

Figure 11A:
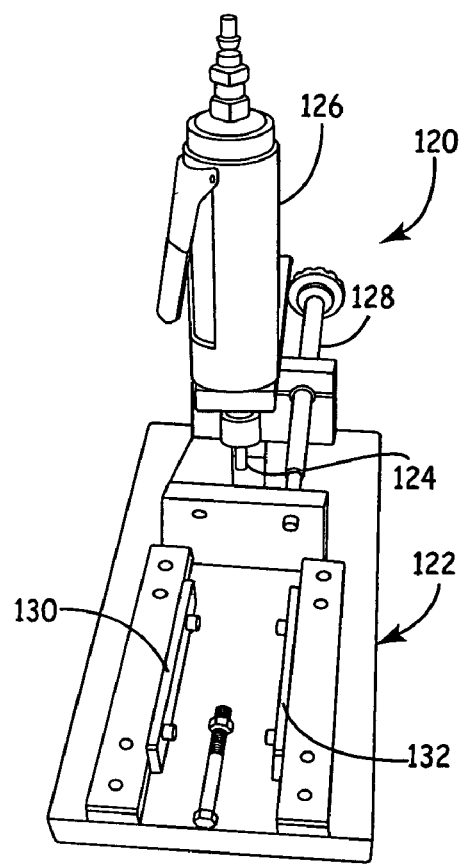
FIG. 11A is a perspective view of a chamfer fixture, which ma be used to chamfer an edge of a finished cut.
Figure 11B:
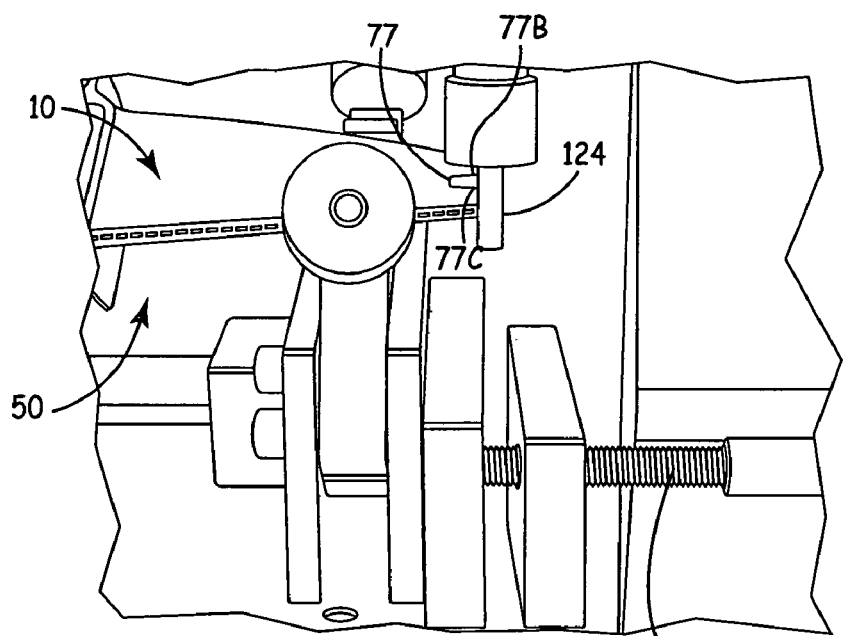
FIG. 11B is a partial perspective side view of the chamfer fixture of FIG. 11A, where the holding fixture has been secured to chamfer fixture.

Once finished cut 77 is formed in blade 10, holding fixture 50 (with blade 10 securely fastened therein) is removed from finish router fixture 100. Edges 118 of finished cut 77 are then chamfered with a third cutting device. In the second embodiment, the third cutting device is chamfer fixture 120, which is shown in FIGS. 11A and 11B. In alternate embodiments, any suitable cutting surface configured to chamfer edge 118 of finished cut 77.

FIG. 11A is a perspective view of chamfer fixture 120, which includes frame 122, carbide cutter 124, air gun 126, and screw 128. As with frame 82 of rough-cut fixture 80, frame 122 includes rails 130 and 132, which mate with corresponding grooves in holding fixture 50 to attach holding fixture 50 to chamfer fixture 120. Holding fixture 50 and chamfer fixture 120 are further secured together using screw 128, which is configured to fit within a corresponding threaded hole 96 (shown in FIG. 11B) in holding fixture 50. In alternate embodiments, holding fixture 50 and chamfer fixture 120 may be secured together using any suitable means.

Carbide cutter 124 is a 0.250" carbide cutter. In alternate embodiments, carbide cutters of any suitable size, or any suitable cutting surface may be used to chamfer edge 118 of finished cut 77 near blade tip 16. Air gun 126 is coupled to carbide cutter 124, and rotates carbide cutter 124 at a high speed. As with air gun 88 of rough-cut fixture 80, air gun 126 maybe any suitable high power air gun, such as, but not limited to, a Dotco, model 1212500-01rt, 23000 rpm, 90 psi/6.1 Bar, which is made commercially available by Coop-erTools, Houston, Tex. In alternate embodiments, any suitable mechanical motor or other driving device may be substituted for air gun 104.

FIG. 11B is a partial perspective side view of chamfer fixture 120, where holding fixture 50 has been attached to chamfer fixture 120 by mating ridges 130 and 132 with corresponding grooves in holding fixture 50. Screw 128 is threaded through threaded hole 96 in holding fixture 50, thereby further securing holding fixture 50 to chamfer fixture 120. Blade 10 is securely clamped to holding fixture 50 and finished cut 77 in tip 16 of blade 10 is aligned with carbide cutter 124. Once again, because blade 10 was previously aligned on holding fixture 50 with set-up fixture 70, positioning holding fixture 50 on chamfer fixture 120 aligns finished cut 77 with carbide cutter 124, such that carbide cutter 124 is centered with finished cut 77.

After attaching holding fixture 50 to chamfer fixture 120, carbide cutter 124 is rotated with air gun 126 as it is placed in contact with finished cut 77, thereby chamfering edge 118 of finished cut 77. As those skilled in the art recognize, a configuration of carbide cutter 124 determines a geometry of a chamfer of edges 77B and 77C of finished cut 77, and a depth of the chamfer may be determined by a thickness of blade 10 wall at tip 16.

Once edge 77B and 77C of finished cut 77 is chamfered, holding fixture 50 (with blade 10 securely fastened therein) is removed from chamfer fixture 120, and blade 10 is removed from holding fixture 50. However, in alternate embodiments, blade 10 may be removed from holding fixture 50 prior to removing holding fixture 50 from chamfer fixture 120. Blade 10 is now prepared for weld repair, and may be weld repaired according to processes known in the art in order to place blade 10 is condition for returning to service in a gas turbine engine.

While blade 10 tip 16 repair was described and depicted in reference to FIGS. 1-11B, other portions of blade 10 may also be repaired in accordance with the principals of the present invention. For example, a trailing edge of the blade could be rough-cut, finish routed and chamfered in a similar manner as just described, as could a blade platform, a vane platform, and/or a vane trailing edge, etc. Further, the present invention is not limited to turbine blades or turbine components. The principals of the present invention, where a slot having a predetermined geometry is formed in a component in order to remove at least a substantial amount of a defect from the component, may be applied to any suitable component.

The terminology used herein is for the purpose of description, not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

The invention claimed is:

1. A method for repairing a defect in a component having a first major surface and a second major surface, a thickness between the major surfaces, and an edge perpendicular to the major surfaces, the method characterized by:
utilizing a template to determine if the component is suitable for repair; and
forming a slot cut entirely through the thickness of the component, the slot extending inward from the edge of the component towards an interior of the component to a depth from the edge sufficient to remove at least a substantial part of the defect, the slot having an open end at the edge of the component, a closed end within the component, a width, a radius at the closed end, and chamfered edges at the open end, wherein the template is utilized prior to forming the slot, and wherein forming the slot in the component comprises:

forming an initial cut in the component with a first cutting surface, wherein the initial cut extends from the edge of the component at least to the defect;

finishing the initial cut to the width and the radius with a second cutting surface, resulting in a finished cut including the edge at an open end of the finished cut at the edge of the component; and chamfering the edge of the finished cut with a third cutting surface.

2. The method of claim 1, wherein the slot is formed using at least one device capable of removing consistent amounts of material from the component regardless of an operator that is operating the at least one device.

3. The method of claim 1, further comprising:
weld repairing the component after the slot is formed therein.

4. The method of claim 1, wherein the component comprises a gas turbine engine component.

5. The method of claim 4, wherein the gas turbine engine component comprises at least one of: a blade and a vane.

6. The method of claim 1, wherein forming the slot in the component comprises:
positioning a single removal device capable of forming the slot in contact with the component.

7. The method of claim 1, further comprising:
securing the component in a fixture configured to receive the component.

8. The method of claim 2, wherein the at least one device comprises a single cutting wheel designed to cut the slot in the component.

9. The method of claim 2, wherein the at least one device comprises:
a rough cutting device capable of rough-cutting the slot in the component;
a finish routing device capable of establishing a consistent routing width and radius at the end of the slot after the slot is rough-cut; and
a chamfering device capable of chamfering the edges of the open end at the edge of the component after the slot is finish routed.

10. The method of claim 1, and further comprising:
positioning the component in a set up device with a predetermined orientation before the slot is formed therein.

11. The method of claim 3 and further comprising:
using the chamfered edges at the open end of the slot to provide a visual indicium of the depth of a weld formed in the slot.

12. The method of claim 1 and further comprising:
fitting the template over at least a portion of the component.

13. A method for repairing a defect in a component having a first major surface and a second major surface, a thickness between the major surfaces, and an edge perpendicular to the major surfaces, the method characterized by:

forming a slot cut entirely through the thickness of the component, the slot extending inward from the edge of the component towards an interior of the component to a depth from the edge sufficient to remove at least a substantial part of the defect, the slot having an open end at the edge of the component, a closed end within the component, a width, a radius at the closed end, and chamfered edges at the open end, wherein forming the slot in the component comprises:

forming an initial cut in the component with a first cutting surface, wherein the initial cut extends from the edge of the component at least to the defect;

finishing the initial cut to a predetermined width and radius with a second cutting surface, resulting in a finished cut including an edge at an open end of the finished cut at the edge of the component; and chamfering the edge of the finished cut with a third cutting surface.

14. A method for repairing a defect in a component having a first major surface and a second major surface, a thickness between the major surfaces, and an edge perpendicular to the major surfaces, the method characterized by:

forming a slot cut entirely through the thickness of the component, the slot extending inward from the edge of the component towards an interior of the component to a depth from the edge sufficient to remove at least a substantial part of the defect, the slot having an open end at the edge of the component, a closed end within the component, a width, a radius at the closed end, and chamfered edges at the open end, wherein the slot is formed using at least one device capable of removing consistent amounts of material from the component regardless of an operator that is operating the at least one device, wherein the at least one device comprises:

a rough cutting device capable of rough-cutting the slot in the component;
a finish routing device capable of establishing a consistent routing width and radius at the end of the slot after the slot is rough-cut; and
a chamfering device capable of chamfering the edges of the open end at the edge of the component after the slot is finish routed.

\* \* \* \* \*

UNITED STATES PATENT AND TRADEMARK OFFICE
CERTIFICATE OF CORRECTION

| | | |
|---|---|---|
| PATENT NO. | : 8,205,334 B2 | Page 1 of 1 |
| APPLICATION NO. | : 11/273057 | |
| DATED | : June 26, 2012 | |
| INVENTOR(S) | : Peter E. Leibfried et al. | |

It is certified that error appears in the above-identified patent and that said Letters Patent is hereby corrected as shown below:

Col. 7, Line 11
  Delete "maybe"
  Insert --may be--

Col. 9, Line 9
  Delete "maybe"
  Insert --may be--

Col. 9, Line 65
  Delete "maybe"
  Insert --may be--

Signed and Sealed this
Twenty-fifth Day of September, 2012

David J. Kappos
*Director of the United States Patent and Trademark Office*